(12) United States Patent
Kalmbach

(10) Patent No.: US 10,532,958 B2
(45) Date of Patent: Jan. 14, 2020

(54) ORGANIC FERTILIZER/PLANT FOOD SUBSTANCE CONTAINING NATURAL ODOR MASKING INGREDIENTS

(71) Applicant: Kalmbach Feeds, Inc., Upper Sandusky, OH (US)

(72) Inventor: Paul M. Kalmbach, Upper Sandusky, OH (US)

(73) Assignee: KALMBACH FEEDS, INC., Upper Sandusky, OH (US)

( * ) Notice: Subject to any disclaimer, the term of this patent is extended or adjusted under 35 U.S.C. 154(b) by 168 days.

(21) Appl. No.: 15/682,995

(22) Filed: Aug. 22, 2017

(65) Prior Publication Data
US 2019/0062233 A1    Feb. 28, 2019

(51) Int. Cl.
| | | |
|---|---|---|
| C05G 1/00 | (2006.01) | |
| C05G 3/00 | (2006.01) | |
| C05F 1/00 | (2006.01) | |
| C05F 5/00 | (2006.01) | |
| C05F 11/08 | (2006.01) | |
| C05F 11/00 | (2006.01) | |
| C05B 17/00 | (2006.01) | |
| C05D 1/02 | (2006.01) | |
| C05F 3/00 | (2006.01) | |
| C05F 11/02 | (2006.01) | |
| C05F 9/04 | (2006.01) | |

(52) U.S. Cl.
CPC ............... *C05G 3/00* (2013.01); *C05B 17/00* (2013.01); *C05D 1/02* (2013.01); *C05F 1/00* (2013.01); *C05F 1/005* (2013.01); *C05F 3/00* (2013.01); *C05F 5/00* (2013.01); *C05F 5/006* (2013.01); *C05F 9/04* (2013.01); *C05F 11/00* (2013.01); *C05F 11/02* (2013.01); *C05F 11/08* (2013.01); *C05G 1/00* (2013.01)

(58) Field of Classification Search
None
See application file for complete search history.

(56) References Cited

U.S. PATENT DOCUMENTS

| | | | |
|---|---|---|---|
| 5,482,529 A | 1/1996 | Ahlnas et al. | |
| 6,159,262 A | 12/2000 | Tumbers | |
| 6,572,669 B1 | 6/2003 | Creech | |
| 7,621,472 B2 * | 11/2009 | Manu | B09B 1/00 241/3 |
| 7,740,680 B2 | 6/2010 | Marks | |
| 2004/0025422 A1 * | 2/2004 | MacQuoid | A01K 1/0154 47/9 |
| 2006/0010712 A1 * | 1/2006 | Carin | C05F 3/00 34/443 |
| 2006/0048555 A1 * | 3/2006 | Kummer | C05F 3/00 71/15 |
| 2006/0101881 A1 * | 5/2006 | Carin | C05F 3/00 71/21 |

(Continued)

Primary Examiner — Wayne A Langel
(74) Attorney, Agent, or Firm — Standley Law Group, LLP; Jeffrey Standley; Adam Smith

(57) ABSTRACT

An organic fertilizer/plant food with a natural ingredient providing a desirable smell to mask the unwanted odors of organic fertilizer. The desirable smelling ingredient to be mixed thoroughly throughout the organic fertilizer such that as the outer layers of the organic fertilizer are processed by microorganisms, the desirable smelling ingredient is revealed at each new layer to create a persistent pleasant smell above the unwanted fertilizer smell.

4 Claims, 3 Drawing Sheets

(56) References Cited

U.S. PATENT DOCUMENTS

| | | | | |
|---|---|---|---|---|
| 2007/0163316 A1* | 7/2007 | Fedkenheuer | ............ | C05C 9/00 71/11 |
| 2010/0099560 A1* | 4/2010 | Hnatowich | ............ | A01C 21/00 504/100 |
| 2014/0274694 A1* | 9/2014 | Rodriguez-Kabana | ...................... | C05F 11/00 504/101 |
| 2014/0352376 A1* | 12/2014 | Carpenter | ............... | C05B 17/00 71/6 |
| 2018/0022657 A1* | 1/2018 | Devisetty | ................ | C05F 11/08 71/27 |
| 2018/0057418 A1* | 3/2018 | Evans | ..................... | C05F 1/005 |
| 2019/0127286 A1* | 5/2019 | Tyree | ..................... | A01G 31/00 |

* cited by examiner

ORGANIC FERTILIZER/PLANT FOOD SUBSTANCE CONTAINING NATURAL ODOR MASKING INGREDIENTS

CROSS-REFERENCE TO RELATED APPLICATIONS

This application is a non-provisional application and does not claim priority to any application.

TECHNICAL FIELD

Exemplary embodiments of the present invention relate to an organic fertilizer/plant food substance and a method for making that substance which contains a desirable smelling ingredient to mask unpleasant odors.

BACKGROUND AND SUMMARY OF THE INVENTION

Soil and plant fertilizers are essential to healthy plants and gardens. Ensuring plants receive the proper amount of nutrients at the proper time remains an important task of all plant caretakers. Technology in this field is ever-growing and there exists a plethora of synthetic fertilizers in the market today. However, recent trends have brought many consumers back to more natural ways of fertilizing or feeding their plants with organic fertilizers or plant foods. Common types of organic fertilizers or plant foods include manure, compost, bone meal, blood meal, worm castings, and fish extracts.

Besides the appeal of organic fertilizers or plant foods sounding "good for the earth" or "natural," the appeal of organic fertilizers or plant foods over synthetic ones is not in the types of nutrients the fertilizer/plant food provides. The benefits of organic fertilizer/plant food come from both the timing the nutrients are available to plants and the resultant soil structure from natural processes occurring.

Soil contains many microorganisms that are constantly working to break down organic matter. Whether you use synthetic or organic fertilizer, these microorganisms are already present in the soil. As these microorganisms break down the organic matter in soil, they release nutrients that the plants are now able to absorb through their roots. It is this constant process that provides the plants with a steady stream of nutrients in a form plants can use. Synthetic fertilizers are limited to the nutrients contained within the substance and have no way of producing a constant stream of nutrients for the plants without reapplication.

Furthermore, the natural process of microorganisms breaking down organic material provides for ideal soil structure for root systems. The constant process involves microorganisms eating the organic material, defecating, and dying. This creates a viscous material that clings to the soil granules to form larger clusters. These clusters create an air-space in the soil layer for water to enter or for roots to develop and expand. Synthetic fertilizers do not provide organic matter to the soil for these microorganisms to consume and, thus, do not enhance the soil structure around the root system of plants.

Synthetic fertilizers also have the potential to provide too much or too little nutrients to the plant system. Plants typically require 13 different nutrients. The three primary nutrients that plants need the most of are nitrogen, phosphorous, and potassium (NPK). Most synthetic fertilizers only focus on NPK levels and disregard the other 10 nutrients plants need. The other 10 nutrients plants need are calcium, magnesium, sulfur, boron, copper, iron, chloride, manganese, molybdenum, and zinc. Organic fertilizer or plant food is constantly replenishing and providing the nutrients plants need, not just NPK. For example, proteins contain a good source of iron. However, the plant cannot absorb an iron molecule trapped inside a protein. The microorganisms can break down the protein to release the iron in a state usable by the plant. Synthetic fertilizers contain no such process and plants are limited to only those additional nutrients already contained in the soil. Moreover, synthetic fertilizers are subject to leaching from rain water or other underground water-level activity.

Although plants need as many as 13 essential nutrients, obtaining too much of these nutrients can be toxic. The danger with synthetic fertilizers lies in the high concentration of nutrients contained therein. If not properly applied to the soil, the plant may intake too many nutrients and start to deteriorate if not die completely. The natural process provided by organic fertilizer/plant food reduces this risk significantly.

One major drawback of using organic fertilizers or plant foods is the offensive smell they persistently give off. This may not come as a surprise given the common ingredients in organic fertilizer: dead fish, dead animal, worm castings, manure, etc. Throughout the entire process of microorganisms eating, defecating, and dying, chemical compounds are constantly released. The compounds humans can smell are typically the compounds containing sulfur. Humans can smell some sulfur compound concentrations as low as 0.0005 to 0.3 parts per million. The genetic purpose behind this is to prevent humans from eating things we should not be. Humans' natural response is to stay away from bad smelling objects because humans genetically know that eating something decomposing and giving off a sulfur smell can harm them greatly.

When it comes to organic fertilizers, there is little risk of a human desiring to consume it. Thus, this smell becomes more of a nuisance and less of an illness-saving genetic mechanism. This smell may prevent a typical person from using organic fertilizer or plant food in the home to feed houseplants or in a garden near the outside of the home. People are left with no choice but to use synthetic fertilizers at the compromise of their preference for organic to avoid the uncomfortable smell of organic fertilizers/plant foods.

Of the known methods of fighting offensive smells, absorption, adsorption, combustion, and masking, only masking has an effect that can persist for an extended period of time as the microorganisms continue to process organic material.

Absorption, perhaps through a water bath or rinse, would be inefficient, as this could only be done once and any subsequent odors would have no protection. Absorption also likely would leach out important nutrients that the plants need.

Adsorption, perhaps with the use of activated carbon, would be ineffective for the simple reason that there is no way to effectively funnel the smelly gases so that they must contact the carbon.

Lastly, combustion is ineffective due to the impracticability of requiring a person to light a candle or start a campfire outside for the mere purpose of burning off smelly gases.

There exists a need for an invention that combines an odor masking ingredient that will persist in the soil with the organic fertilizer. The present invention is designed to overcome this problem.

An exemplary embodiment of the invention will include an ingredient with a desirable smell to mask the foul odors of organic fertilizer/plant food. This ingredient may be vanilla, anise, apple, caramel, orange, lime, lemon, mandarin, grape fruit, citrus, lavender, peppermint, raspberry, clove, cinnamon, banana, butter, carrot, cherry, eucalyptus, coconut, chocolate, garlic, grape, maple, strawberry, persimmon or any other desirable smelling ingredient. This ingredient may be thoroughly integrated into the organic fertilizer or plant food mixture so that the ingredient is consistent throughout the fertilizer.

As microorganisms break-down the outer surface of the organic fertilizer, new layers of the desirable smelling ingredient will be revealed. This will continually release the desirable odor throughout the effective life of the organic fertilizer. These desirable odors will mask the foul odors so the user does not experience the constant unpleasant smell of organic fertilizer, but instead experiences a subtle note of a desirable smell. It is important to not add too much of the desirable smelling ingredient as many desirable-smelling ingredients have an unpleasant smell in high concentrations.

DETAILED DESCRIPTION OF THE INVENTION

Various embodiments of the invention will now be described in detail with reference to the accompanying drawing. These figures are merely provided to assist in the understanding of the invention and are not intended to limit the invention in any way. One skilled in the art will recognize that various modifications and changes can be made to any of these embodiments without departing from the scope and spirit of the present invention.

An exemplary embodiment of the invention may contain a mixture combination of an organic desirable smelling ingredient, other organic material, and minerals. This other organic material may include but is not limited to or limited by the following ingredients: soybean meal, wheat midds, meat, bone meal, poultry manure, molasses, alfalfa, feather meal, kelp, soybean oil, fish bone meal, fish meal, water, and mycorrhiza. Minerals may include but is not limited to or limited by the following ingredients: tri-calcium phosphate, potassium magnesium sulfate, sulfate of potash, sulfate of potash magnesia, rock phosphate, lime, greensand, and zeolite.

One skilled in the art will recognize that mycorrhiza on the list above is a fungus. The fertilizer/plant food mixture invention may contain a different fungus or microorganism besides mycorrhizal fungi, or the fertilizer may not contain any intentional addition of microorganisms, instead allowing the fertilizer mixture to utilize existing microorganisms in the soil where applied.

Figure 1:
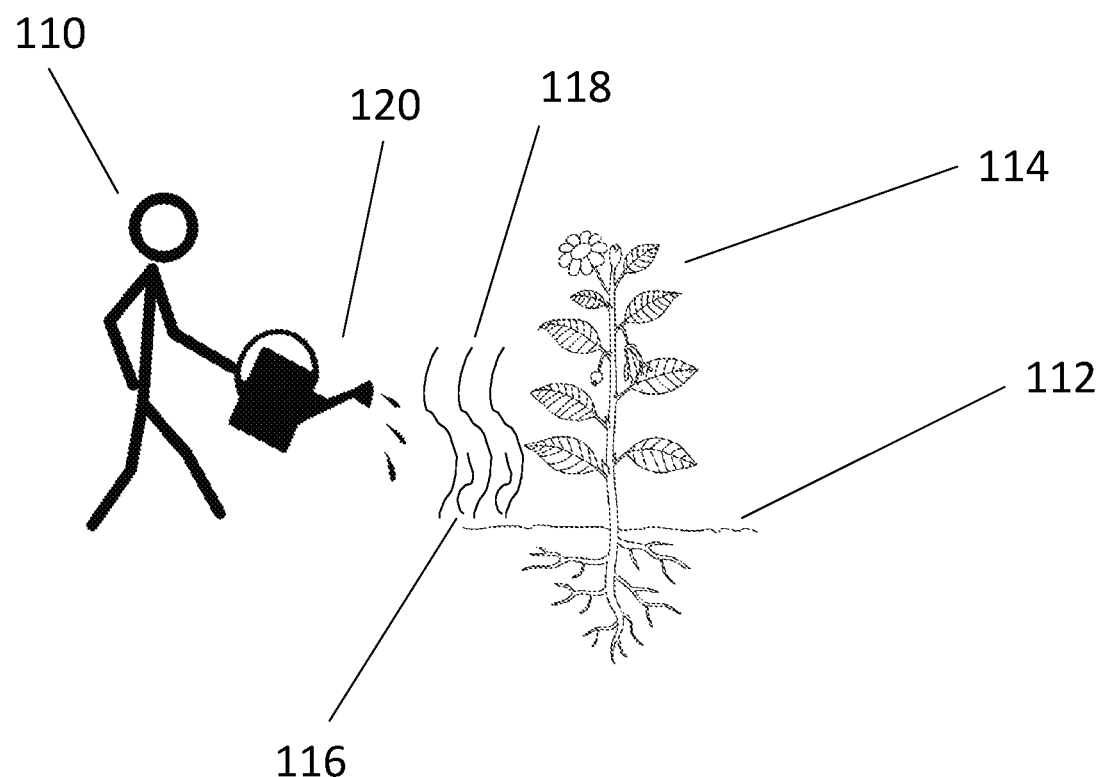
FIG. 1 is a diagram of an example use of the invention.

Referring to FIG. 1, this organic fertilizer/plant food may be applied by a person 110 to the soil 112 where the person currently has plants 114 growing or intends to grow soon. Because the organic fertilizer enhances soil 112 quality, this fertilizer can be used even before anything is planted in the soil 112. The organic fertilizer will always be emitting bad smells 116 due to the ingredients of the organic fertilizer and the microorganism process to break down the organic material. The addition of the desirable smelling ingredient causes the emission of a more potent odor 118 to mask the unpleasant organic fertilizer odors 116. The person 110 may never smell the foul odor 116 because the person 110 will only recognize the overpowering pleasant smell 118. As the microorganisms in the soil 112 continue to break down the outer surface layer of any fertilizer particles, more pleasant-smelling ingredient is revealed, constantly emitting pleasant odors 118 to mask unpleasant ones 116. Any leaching that may be caused by watering 120 or rain water, may merely remove the scent from the outer layer of fertilizer particles, still allowing the further layers of pleasant smelling ingredient to emit a pleasant odor 118 shortly after leaching may occur.

Figure 2:
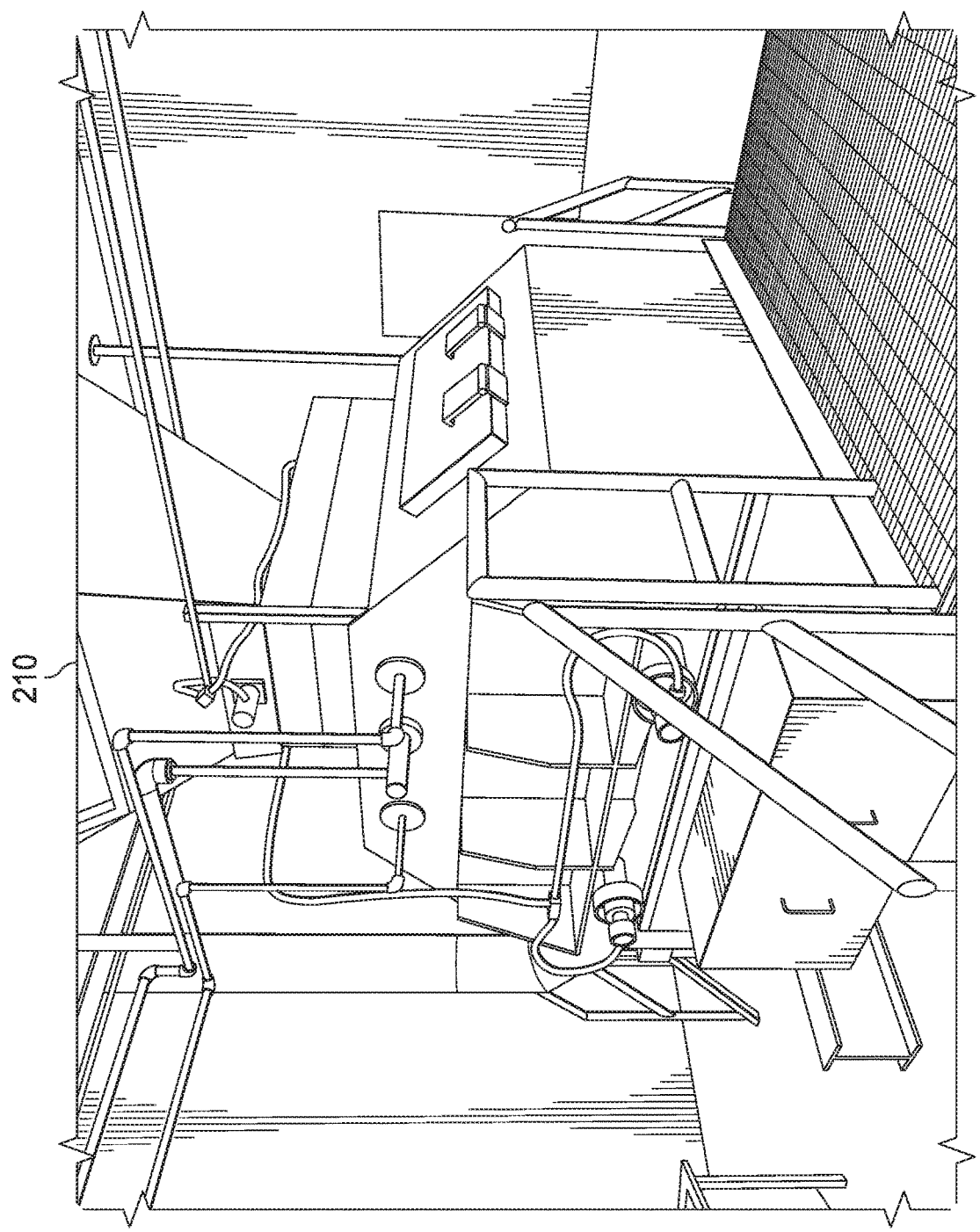
FIG. 2 is a sample industrial mixer to mix the invention.

Referring to FIG. 2, this fertilizer invention may be mixed using an industrial mixer 210. Formulation ingredients of the present invention may be combined into the mixer, and the mixer actuated to thoroughly and consistently blend together the ingredients so that the desirable aroma(s) is fully throughout the resultant mixture.

Figure 3:
FIG. 3 is a block diagram of an example process for making the invention.

Referring to FIG. 3, all ingredients may be accurately measured and mixed together 310 in an industrial mixer 210 with a binding agent. This binding agent may be for example, Ameribond, or other bonding agent, or no binding agent may be required at all depending on the desired consistency of the fertilizer. The ingredients may then be thoroughly mixed together to create a mash 312. The mash is then turned into pellets at a pellet-milling machine 314. The pellet temperature is cooled down to a specified temperature range 314 relative to the ambient temperature. The cooled pellets are then sent to a roller mill 316 to acquire a desirable consistency and texture. The ground-up pellets are then screened to ensure the correct size and texture is present 318. All pellet sizes that remain too large or too small are sent back to the pellet-milling machine 314, and all properly broken-down pellets are ready for use 320.

An exemplary embodiment of the invention may include, but not be limited to or limited by the following, presented in weight percent of the total formulation:

| | |
|---|---|
| Organic material (including animal source and/or plant source) | 25-80%; |
| A desirable smelling ingredient | 0.1-3%; |
| Minerals | 0-20%; |
| Molasses | 0-8%; and, |
| Fillers and binders | 5-30%. |

Another exemplary embodiment of the present invention is as follows:

| | |
|---|---|
| Animal manure (by weight percent) | 85-99% |
| Molasses | 0-15% |
| Desirable smelling ingredient | 0.1-3% |

Yet another exemplary embodiment of the present invention is as follows:

| | |
|---|---|
| peat (by weight percent) | 85-99% |
| Molasses | 0-15% |
| Desirable smelling ingredient | 0.1-3% |

Yet another exemplary embodiment of the present invention is as follows:

| | |
|---|---|
| Animal slaughter remains (by weight percent) | 85-99% |
| Molasses | 1-15% |
| Desirable smelling ingredient | 0.1-3% |

Yet another exemplary embodiment of the present invention is as follows:

| | |
|---|---|
| Plant matter compost (by weight percent) | 85-99% |
| Molasses | 1-15% |
| Desirable smelling ingredient | 0.1-3% |

Yet another exemplary embodiment of the present invention is as follows:

| | |
|---|---|
| Plant meal (by weight percent) | 20-60% |
| Bone meal | 0-45% |
| Fungi | 0-10% |
| Molasses | 1-10% |
| Minerals | 1-20% |
| Fillers and binders | 1-45% |
| Desirable smelling ingredient | 0.1-3% |

Even further exemplary embodiments of the present invention are set forth in the charts below:

| | Formula (percent by weight) | | |
|---|---|---|---|
| Ingredient | A | B | C |
| Plant based ingredients | 30-50 | 30-50 | 0-20 |
| Animal based ingredients | 25-45 | 50-70 | 10-30 |
| Minerals | 10-30 | 1-20 | 1-20 |
| Manure | 0 | 0 | 20-50 |
| Fungi | 0-2 | 0-1 | 0-2 |
| Molasses | 0.5-15 | 0.5-15 | 0.5-15 |
| Flavors or aromas | 0.1-2 | 0.1-2 | 0.1-2 |
| Water | 0-10 | 0-10 | 0-10 |
| Binders & other | 0-10 | 0-10 | 0-10 |

| Ingredient | Examples |
|---|---|
| Plant based ingredients | Soy bean meal, wheat midds, ground corn etc. |
| Animal based ingredients | Blood meal, feather meal, fish bone meal etc. |
| Minerals | Tri-calcium phosphate, sulfate of potash etc. |
| Manure | Poultry manure etc. |
| Microorganism | Fungi, bacteria, archaea etc. |
| Molasses | Cane or beet molasses |
| Flavors or aromas | Vanilla, peppermint, citrus etc. |
| Water | Water |
| Binders & other | Pellet binders etc. |

Any embodiment of the present invention may include any of the optional or exemplary features of the other embodiments of the present invention. The embodiments herein disclosed are not intended to be exhaustive or to unnecessarily limit the scope of the invention. The embodiments were chosen and described in order to explain the principles of the present invention so that others skilled in the art may practice the invention. Having shown and described embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An organic fertilizer or plant food for plants and soil comprising:
   a mixture of an aromatic ingredient in a range of 1 to 3 percent by weight of said mixture;
   at least one of soybean meal or wheat midds in a range of 20 to 50 percent of the total mixture by weight;
   at least one of blood meal, feather meal, or bone meal in a range of 1 to 30 percent of the total mixture by weight;
   tri-calcium phosphate in a range of 1 to 10 percent of the total mixture by weight;
   potassium magnesium sulfate in a range of 1 to 10 percent of the total mixture by weight; and
   molasses in a range of 1 to 8 percent of the total mixture by weight.

2. The organic fertilizer or plant food of claim 1, wherein:
   the aromatic ingredient is selected from the group consisting of:
   vanilla;
   anise;
   apple;
   caramel;
   orange;
   lime;
   mandarin;
   lemon;
   grape fruit;
   citrus;
   raspberry;
   clove;
   cinnamon;
   banana;
   butter;
   carrot;
   cherry;
   eucalyptus;
   coconut;
   chocolate;
   garlic;
   grape;
   maple;
   strawberry;
   persimmon;
   lavender; and
   peppermint.

3. The organic fertilizer or plant food of claim 1, wherein;
   the mixture comprises a microorganism not otherwise present.

4. The organic fertilizer or plant food of claim 3, wherein:
   the microorganism is mycorrhizal fungi.

\* \* \* \* \*